United States Patent
Sudharshan et al.

(10) Patent No.: US 9,843,495 B2
(45) Date of Patent: Dec. 12, 2017

(54) SEAMLESS MIGRATION FROM RAPID SPANNING TREE PROTOCOL TO ETHERNET RING PROTECTION SWITCHING PROTOCOL

(71) Applicants: Hariprasad Sudharshan, Chennai (IN); Michael Colven, Dallas, TX (US)

(72) Inventors: Hariprasad Sudharshan, Chennai (IN); Michael Colven, Dallas, TX (US)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 14/836,379

(22) Filed: Aug. 26, 2015

(65) Prior Publication Data

US 2017/0063617 A1 Mar. 2, 2017

(51) Int. Cl.
  *H04L 12/28* (2006.01)
  *H04L 12/701* (2013.01)
  *H04L 12/40* (2006.01)
  *H04L 12/751* (2013.01)
  *H04L 12/705* (2013.01)

(52) U.S. Cl.
  CPC .............. *H04L 45/00* (2013.01); *H04L 12/40* (2013.01); *H04L 45/02* (2013.01); *H04L 45/18* (2013.01)

(58) Field of Classification Search
  CPC ... H04L 41/0813; H04L 12/462; H04L 45/66; H04L 49/351; H04L 49/354
  USPC ........................................................ 370/256
  See application file for complete search history.

(56) References Cited

U.S. PATENT DOCUMENTS

| | | | |
|---|---|---|---|
| 6,430,151 B1 * | 8/2002 | Glas | H04L 1/22 370/222 |
| 9,385,885 B2 * | 7/2016 | Kulkarni | H04L 12/42 |
| 9,699,021 B2 * | 7/2017 | Behrens | H04L 41/0654 |
| 2005/0201409 A1 * | 9/2005 | Griswold | H04L 12/437 370/445 |
| 2007/0025275 A1 * | 2/2007 | Tallet | H04L 45/02 370/255 |
| 2007/0171814 A1 * | 7/2007 | Florit | H04L 12/437 370/216 |
| 2008/0198769 A1 * | 8/2008 | Tzeng | H04L 12/462 370/256 |
| 2008/0250124 A1 * | 10/2008 | Rentschler | H04L 12/2697 709/220 |

(Continued)

FOREIGN PATENT DOCUMENTS

WO 2009/019168 2/2009

*Primary Examiner* — Asad Nawaz
*Assistant Examiner* — Berhanu Belete
(74) *Attorney, Agent, or Firm* — Baker Botts L.L.P.

(57) ABSTRACT

Methods and systems are provided for migrating loop-breaking protocols in an Ethernet network. The method includes disabling a port of a first leaf network element in a network implementing a rapid spanning tree protocol (RSTP), the RSTP having a spanning tree with a root network element coupled to the first leaf network element forming a first branch of the spanning tree; migrating the first leaf network element by disabling the RSTP and enabling an Ethernet ring protection switching (ERPS) protocol on the first leaf network element; migrating the root network element after the first leaf network element by disabling the RSTP and enabling the ERPS protocol on the root network element; and enabling the port of the first leaf network element after migrating the first leaf network element and the root network element.

13 Claims, 4 Drawing Sheets

(56) References Cited

U.S. PATENT DOCUMENTS

| | | | |
|---|---|---|---|
| 2008/0279203 A1* | 11/2008 | Ramalho Ribeiro dos Santos | H04L 45/02 370/406 |
| 2009/0022069 A1* | 1/2009 | Khan | H04L 12/4633 370/256 |
| 2009/0249115 A1* | 10/2009 | Bycroft | H04L 12/462 714/47.1 |
| 2010/0195660 A1* | 8/2010 | Jiang | H04L 12/462 370/400 |
| 2010/0309821 A1* | 12/2010 | Sergeev | H04L 12/462 370/256 |
| 2011/0317555 A1* | 12/2011 | Kleineberg | H04L 12/40176 370/230 |
| 2012/0008530 A1* | 1/2012 | Kulkarni | H04L 12/42 370/256 |
| 2012/0201539 A1* | 8/2012 | Boertjes | H04J 14/0204 398/51 |
| 2012/0250695 A1* | 10/2012 | Jia | H04L 12/42 370/400 |
| 2013/0064071 A1* | 3/2013 | Bos | H04L 12/437 370/223 |
| 2013/0254356 A1* | 9/2013 | Eastlake, III | H04L 45/74 709/220 |
| 2014/0293774 A1* | 10/2014 | Behrens | H04L 12/437 370/225 |

* cited by examiner

SEAMLESS MIGRATION FROM RAPID SPANNING TREE PROTOCOL TO ETHERNET RING PROTECTION SWITCHING PROTOCOL

BACKGROUND

Field of the Disclosure

The present disclosure relates to computer networking, and more specifically, migration from rapid spanning tree protocol to Ethernet ring protection switching protocol.

Description of the Related Art

Ethernet networks are often comprised of network elements communicating information back and forth to each other. Information may be communicated between network elements in the form of data packets, or blocks of data individually sent and delivered. The network elements (e.g., routers, switches, and bridges) may process incoming data packets to determine the appropriate network link on which to forward the data packet in order for the data packet to reach its target destination.

A loop among network elements (a network loop) may degrade network performance or cause network failure. Thus, loop-breaking protocols may be implemented in a network to prevent loops from occurring between the network elements. Examples of loop-breaking protocols include spanning tree protocol (STP), rapid spanning tree (RSTP), multiple spanning tree (MSTP), and Ethernet ring protection switching (ERPS) protocol as defined by the IEEE 802 standards and the International Telecommunications Union Telecommunication Standardization Sector (ITU-T) Recommendations G.8032.

SUMMARY

In particular embodiments, a method includes disabling a port of a first leaf network element in a network implementing a rapid spanning tree protocol (RSTP), the RSTP having a spanning tree with a root network element coupled to the first leaf network element forming a first branch of the spanning tree. The method also includes migrating the first leaf network element by disabling the RSTP and enabling an Ethernet ring protection switching (ERPS) protocol on the first leaf network element. The method further includes migrating the root network element after the first leaf network element by disabling the RSTP and enabling the ERPS protocol on the root network element. The method also includes enabling the port of the first leaf network element after migrating the first leaf network element and the root network element.

In another embodiment, a network element includes a processor configured to disable a port of a first leaf network element in a network implementing a rapid spanning tree protocol (RSTP), the RSTP having a spanning tree with a root network element coupled to the first leaf network element forming a first branch of the spanning tree. The processor is further configured to migrate the first leaf network element by disabling the RSTP and enabling an Ethernet ring protection switching (ERPS) protocol on the first leaf network element. The processor is also configured to migrate the root network element after the first leaf network element by disabling the RSTP and enabling the ERPS protocol on the root network element. The processor is further configured to enable the port of the first leaf network element after migrating the first leaf network element and the root network element.

In another embodiment, a method includes disabling a port of a first leaf network element in a network implementing a rapid spanning tree protocol (RSTP), the RSTP having a spanning tree with a root network element coupled to the first leaf network element forming a first branch of the spanning tree. The method also includes disabling the RSTP on the first leaf network element. The method further includes disabling the RSTP on the root network element after the first leaf network element. The method also includes enabling Ethernet ring protection switching (ERPS) protocol on the first leaf network element. The method further includes enabling ERPS protocol on the root network element after the first leaf network element. The method also includes enabling the port of the first leaf network element after enabling ERPS protocol on the first leaf network element and the root network element.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
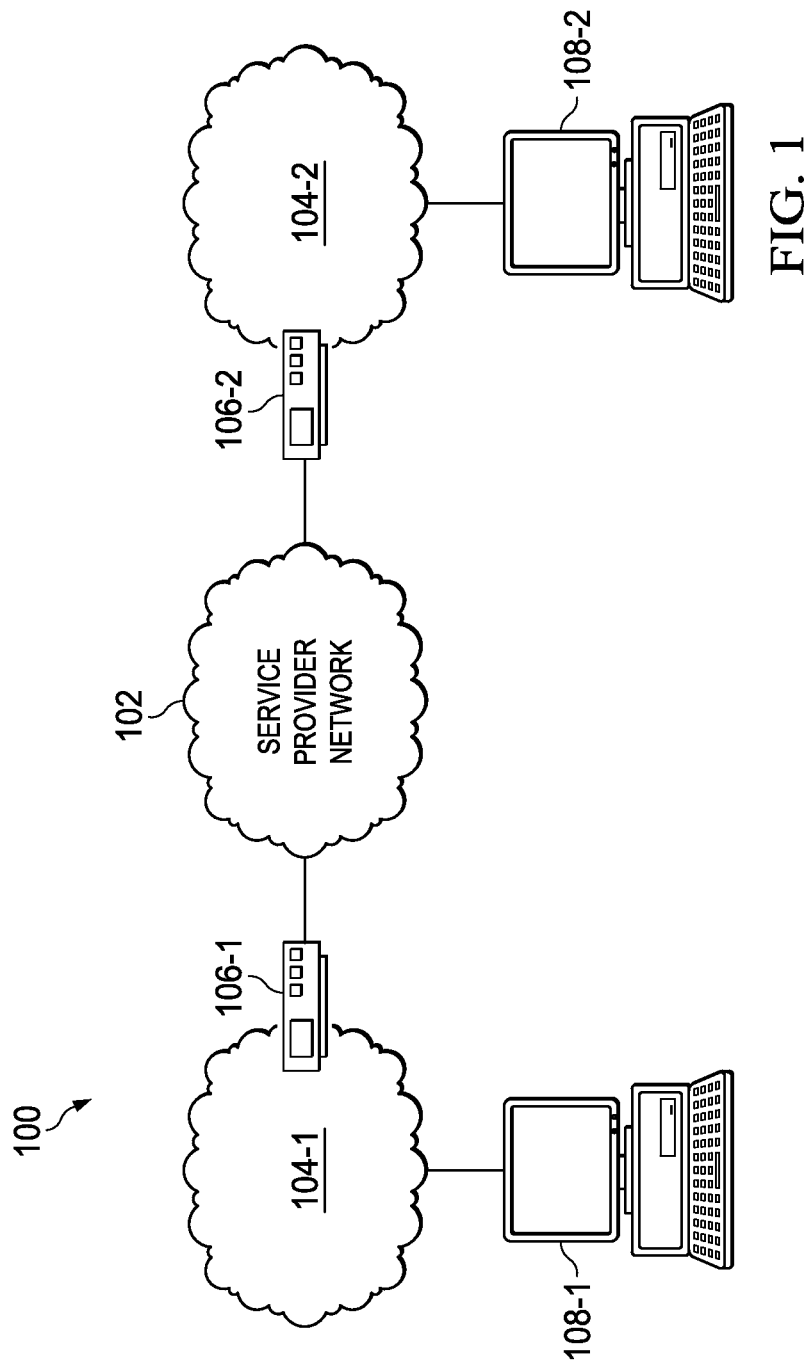
FIG. 1 illustrates a block diagram of selected elements of an embodiment of a general network according to the present disclosure.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device "72-1" refers to an instance of a device class, which may be referred to collectively as devices "72" and any one of which may be referred to generically as device "72".

In an Ethernet network, a network element may function as a bridge, analyzing incoming data packets and directing them to the appropriate outgoing network links based on the destination address of the data packet. The bridge may "learn" the network topology by analyzing the source addresses of the incoming data packets at each link and building an address table of network elements connected to that link. When an incoming data packet arrives, the bridge may look for the destination address within its network address table to determine the network link(s) on which to send the data packet. If the destination address is in its address table, then the bridge may forward the data packet on the appropriate network link associated with the destination address in the address table so that the data packet may ultimately reach its destination. However, if the destination address is not in its address table, then the bridge may flood the data packet to all outgoing links. A loop among the network elements may cause a network storm to occur as the network elements rebroadcast the data packet, ultimately reaching back to the source, which itself may rebroadcast the packet again. A network storm may cause network performance to degrade or possibly result in a network failure as rebroadcasting of data packets consumes exponentially increasing network resources.

In order to prevent a network storm, an Ethernet network may use a loop-breaking protocol, such as spanning tree protocol (e.g., spanning tree protocol, rapid spanning tree protocol, and multiple spanning tree protocol) or Ethernet ring protection switching (ERPS) protocol (e.g., G.8032), to disable links between particular network elements in order to ensure a loop-free network topology. The loop-breaking protocol may block a port at one or more network elements to disable one or more network links between network elements so that data packets are not forwarded across the disabled links. Preventing the flow of data packets on particular links may disable loops in the network and prevent a network storm from occurring. In addition to disabling network loops, the loop-breaking protocol may also assist in maintaining a connected network in the event of a network failure. For example, the loop-breaking protocol may enable a disabled network link (e.g., by unblocking a previously blocked port) if another network link or network element unexpectedly fails. Thus, the loop-breaking protocol may prevent network loops and help restore network connectivity in the event of a network failure.

It may be desirable to migrate from one loop-breaking protocol to another loop-breaking protocol in a network. For example, Ethernet ring protection switching (ERPS) protocol may be optimized for networks configured in a ring topology. By contrast, rapid spanning tree protocol (RSTP) may be designed to function in any network topology, requiring additional overhead and lacking optimizations for a ring network. Thus, a ring network using ERPS protocol may recover faster from a network failure compared to a ring network using RSTP. Accordingly, migrating from RSTP to ERPS protocol in a ring network may improve overall network performance and reliability. However, migrating from RSTP to ERPS protocol may result in network outages or degraded performance during the migration. As will be described in detail herein, the present disclosure provides a novel solution for migrating from RSTP to ERPS protocol to minimize effects on network performance and reliability during the migration.

FIG. 1 illustrates a block diagram of selected elements of an embodiment of a general network according to the present disclosure. Customer networks 104-1 and 104-2 may be communicatively coupled through service provider network 102. Namely, service provider network 102 may be configured to receive and transport traffic between the customer networks. In particular embodiments, customer network 104-1, customer network 104-2, and/or service provider network 102 may include one or more transport networks. Customer networks 104-1 and 104-2 may couple to service provider network 102 via one or more customer edge devices 106, representing a user network interface or a demarcation between customer networks 104-1 and 104-2, and service provider network 102. Customer edge device 106 may be any suitable system operable to transmit and receive network traffic, such as network element 202 disclosed with respect to FIG. 2. As an example and not by way of limitation, customer edge device 106 may be a router or switch located at or near the customer premises.

One or more customer systems 108 may be communicatively coupled to customer network 104-1 and 104-2. For example, customer system 108-1 may be coupled to customer network 104-1, and customer system 108-2 may be coupled to customer network 104-2. Although shown as desktop computer systems, customer system 108 may be any device that communicatively couples to a network, including for example, a computer, PDA, consumer electronic device, network storage device, network printer, or another suitable device and may vary in size, shape, performance, functionality, and price. Customer system 108-1 may desire to communicate information with customer system 108-2 or another system coupled to customer network 104-2. However, customer networks 104-1 and 104-2 may be located at different physical locations or otherwise lack a direct network connection. Therefore, customers may engage the services of a service provider, in the form of service provider network 102, to communicate information between customer networks 104-1 and 104-2. Thus, service provider network 102 may provide forwarding of network traffic between various customer systems 108 coupled to customer networks 104-1 and 104-2. Specifically, service provider network 102 may provide Ethernet links to communicatively couple customer networks 104-1 and 104-2, such that in some embodiments, it may appear as though the two networks are a single local area network (LAN).

Modifications, additions, or omissions may be made to network 100 without departing from the scope of the disclosure. The components and elements of network 100 described may be integrated or separated according to particular needs. Moreover, the operations of network 100 may be performed by more, fewer, or other components. For example, in some embodiments, customer network 104 may couple to two or more service provider networks. In some embodiments, service provider network 102 may service a plurality of customers and customer networks 104.

Figure 2:
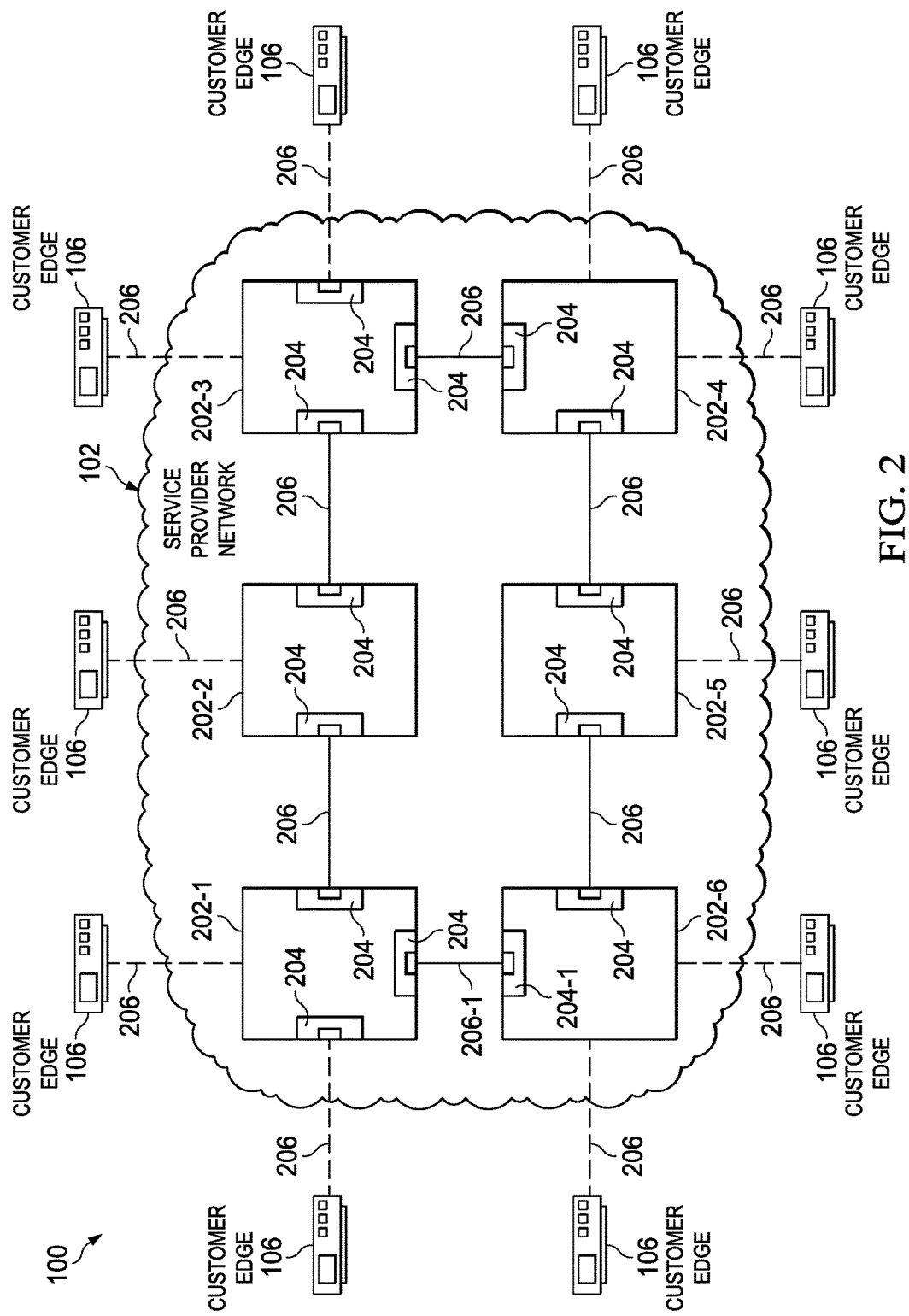
FIG. 2 illustrates a block diagram of selected elements of an embodiment of a network architecture configured in a ring topology.

FIG. 2 illustrates a block diagram of selected elements of an embodiment of exemplary network architecture 100. One or more customer edge devices 106 may be communicatively coupled via service provider network 102, which may represent an implementation of network 100 described above with respect to FIG. 1. Service provider network 102 may include network elements 202 coupled by transmission media 206 through ports 204. In certain embodiments, network elements 202 may also couple to one or more customer edge devices 106 and/or network elements 202 of other networks (not expressly shown) via transmission media 206. In some embodiments, network elements 202 in service provider network 102 may form a ring topology, such as the network ring formed by network elements 202-1→202-2→202-3→202-4→202-5→202-6 as illustrated in FIG. 2.

Network 100 may include one or more transmission media 206 operable to transport one or more signals communicated by components of network 100. Each transmission medium 206 may include any system, device, or apparatus configured to communicatively couple network elements 202 to each other and communicate information between them. For example, a transmission medium 206 may include an optical fiber, an Ethernet cable, a T1 cable, a Wi-Fi or Bluetooth connection, and/or any other suitable medium.

Network elements 202 (including customer edge devices 106) may communicate information or "traffic" over transmission media 206. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may be transmitted deterministically (also referred to as 'real-time') and/or stochastically. Traffic may be communicated via any suitable communications protocol, including, without limitation, the Open Systems Interconnection (OSI) standard and Internet Protocol (IP). Additionally, the traffic communicated via network 100 may be structured in any appropriate manner including, but not limited to, frames or packets.

Each network element 202 in network 100 may comprise any suitable system operable to transmit and receive network traffic. For example, network element 202 may be a hub, router, switch, bridge, or any other system or device operable to transmit and receive network traffic. In the illustrated embodiment, each network element 202 may be operable to transmit traffic directly to one or more other network elements 202 and receive traffic directly from one or more other network elements 202 via transmission medium 206. As discussed above, customer edge devices 106 may be a type of network element 202. Network elements 202 may support one or more loop-breaking protocols, such as spanning tree protocol (e.g., spanning tree protocol, rapid spanning tree protocol, and multiple spanning tree protocol) or ERPS protocol (e.g., G.8032).

Service provider network 102 may implement a loop-breaking protocol to prevent network loops and thus prevent a network storm caused by such loops. For example, service provider network 102 may implement rapid spanning tree protocol (RSTP), as defined by IEEE 802.1w. One network element 202 may be selected as the root of the RSTP spanning tree. For example, network element 202-4 may be selected as the root of the spanning tree by the network administrator or the other network elements 202 in the network. By passing administrative data packets (e.g., Bridge Protocol Data Units or other information regarding the spanning tree) between network elements 202, RSTP may learn the topology of the network to facilitate the transfer of data packets between the network elements, detect the existence of loop(s) in the network, and determine which port(s) to block in order to break such loops.

Figure 2B:
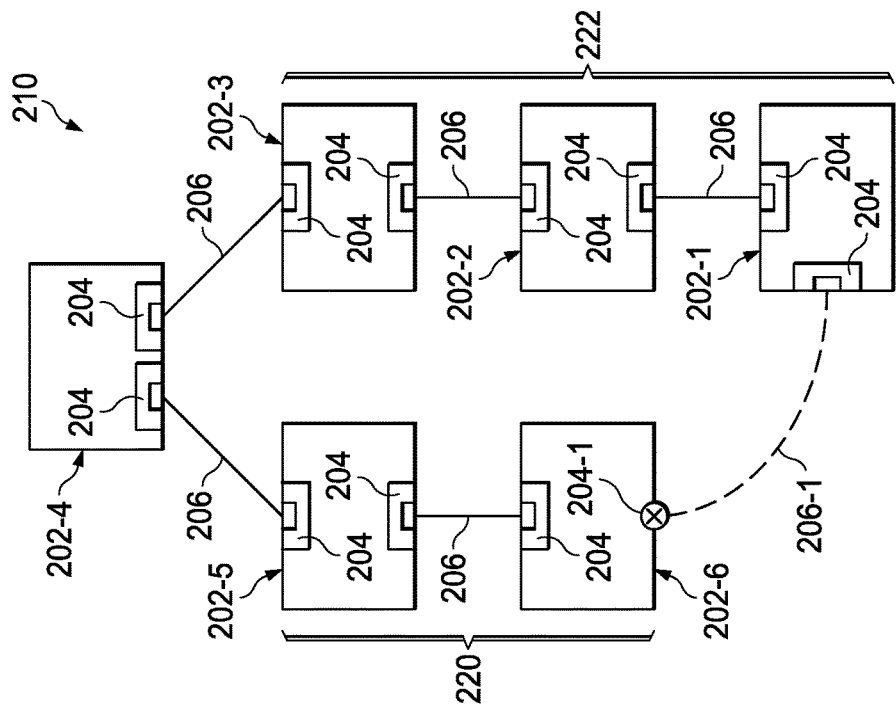
FIG. 2B illustrates a block diagram of a representative spanning tree for selected elements of an embodiment of a network architecture with a port disabled to break a network loop.
Figure 2A:
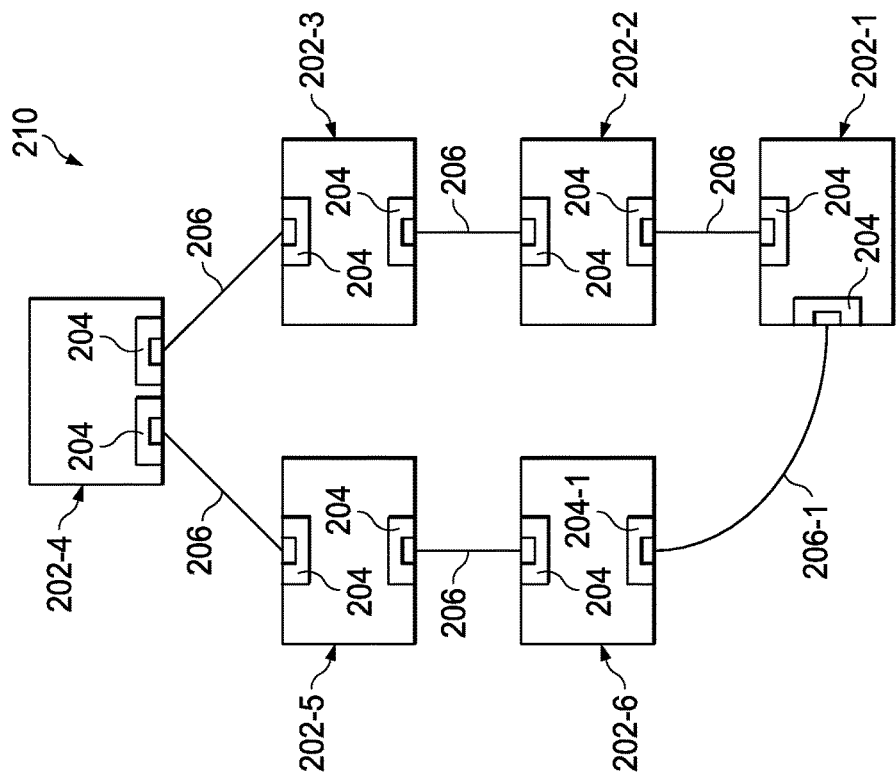
FIG. 2A illustrates a block diagram of a representative spanning tree for selected elements of an embodiment of a network architecture.

FIG. 2A illustrates a block diagram of a representative spanning tree 210 for service provider network 102 illustrated in FIG. 2. Spanning tree 210 may be calculated and configured by the RSTP running on the network elements based on the bridge protocol data units passed between the network elements. RSTP may detect the existence of a loop in service provider network 102 as formed by network elements 202-1, 202-2, 202-3, 202-4, 202-5, and 202-6. To break the loop and prevent a network storm, RSTP may disable one or more links connecting the network elements.

FIG. 2B illustrates a block diagram of a representative spanning tree 210 for service provider network 102 illustrated in FIG. 2 with a port disabled to break the network loop. After detecting the existence of a loop in service provider network 102, the RSTP may block port 204-1 of network element 202-6 so that data packets are no longer permitted to pass across the transmission medium 206-1 connecting network elements 202-6 and 202-1. After disabling the link connecting network elements 202-6 and 202-1, spanning tree 210 may be comprised of two branches extending from root network element 202-4. For example, root network element 202-4 may couple to spanning tree branch 220 (e.g., network elements 202-5→202-6) and spanning tree branch 222 (e.g., network elements 202-3→202-2→202-1), representing the active links between network elements 202 in service provider network 102 after RSTP has rendered the network loop free. Spanning tree branches 220 and 222 may represent the two ring segments between network element 202-4 (the root network element) and network element 202-6 (the leaf network element with the blocked port).

At some time later, a network administrator may desire to migrate service provider network 102 from RSTP to ERPS protocol. As discussed above, ERPS protocol may offer faster recovery times in response to a network failure and/or less overhead associated with maintaining a loop-free topology. For example, ERPS protocol may be optimized for networks configured in a ring topology such that recovery from a network failure may not require computation, provisioning, or the exchange of data between the network elements to respond.

In some embodiments, it may be desirable to migrate from RSTP to ERPS protocol without impacting the performance of reliability of the network. For example, the network administrator of service provider network 102 may seek to migrate from RSTP to ERPS protocol without impacting customers or other users communicating via service provider network 102. Disabling RSTP on network elements 202 may increase administrative traffic as RSTP on other network elements respond to a perceived network failure (e.g., the disabling of RSTP on a network element in the ring) and/or reconfigure the spanning tree illustrated in FIGS. 2A and 2B. Increased administrative traffic may slow customer network traffic. Similarly, some data packets may be dropped while the RSTP spanning tree is reconfigured and address tables are updated in the remaining network elements. In addition, performance and reliability of the network may be affected by a network storm if a loop occurs during the migration from RSTP to ERPS protocol. Therefore, it may be desirable to prevent network loops and minimize reconfiguration of the RSTP spanning tree to ensure minimal disruption of the network during the migration.

Returning to FIG. 2, a port may be manually shut down on one of the network elements in the ring to maintain the loop-free network topology during the migration process. For example, port 204-1 on network element 202-6 may be manually shut down to ensure that data packets do not pass through port 204-1. During migration from RSTP to ERPS protocol, RSTP on network element 202-6 may be disabled, which may cause port 204-1 to transition from blocked to unblocked. However, shutting down port 204-1 may nonetheless ensure that data packets are unable to pass through port 204-1 even after RSTP has been disabled on network element 202-6. Thus, shutting down port 204-1 may maintain a loop-free topology for service provider network 102 during the migration from RSTP to ERPS protocol, and thus prevent a network storm from occurring.

The order of disabling RSTP on the network elements may be selected to prevent increased administrative traffic and dropped packets during the migration. In some embodiments, RSTP may be disabled from the leaves of the spanning tree (e.g., network elements 202-6 and 202-1) along spanning tree branches 220 and 222 of FIG. 2B. Disabling RSTP on network elements 202-4, 202-5, 202-3, or 202-2—the non-leaf networks elements from spanning tree 210 illustrated in FIG. 2B—before the leaf network elements may cause RSTP to respond as though the network element is no longer available, similar to a network failure. As a result, RSTP may generate administrative traffic as it re-calculates network paths and reconfigures spanning tree 210 to identify which port(s) to unblock in order to resume connectivity between the other network elements. Increased administrative traffic may degrade network performance. In addition, some data packets may be dropped while spanning tree 210 is updated if network elements continue to forward data packets based on out-of-date address tables. By contrast, disabling network elements 202-6 or 202-1 (the leaf network elements) may not cause RSTP updates because the other network elements may continue to communicate along the same network links using the same address tables as before. Disabling RSTP on network elements sequentially along spanning tree branches 220 and 222, from the leaves to the root may ensure network performance and reliability during the migration from RSTP to ERPS protocol. In some embodiments, the root of the spanning tree may be the last network element in which RSTP is disabled.

After disabling RSTP, ERPS protocol may be enabled on the network elements. A network element 202 may be selected as the ring protection link (RPL) owner, charged with disabling or blocking traffic on a particular network link (referred to as the ring protection link) to ensure a loop-free network topology. In some embodiments, the network element with the port previously blocked by RSTP may be selected as the RPL owner. In certain embodiments, the ring protection link may be selected such that network traffic is blocked on the same network link that was previously disabled by RSTP. To illustrate, network element 202-6 (a leaf of spanning tree 210 and the network element with port 204-1 previously blocked by RSTP) may be selected as the RPL owner and the network link between network elements 202-6 and 202-1 (the same link disabled by RSTP before the migration) may be selected as the ring protection link. In other embodiments, any of network elements 202 may be selected as the RPL owner and a network link from that network element as the ring protection link.

Once an RPL owner has been selected, the ERPS protocol may be enabled on the network elements. To begin, ERPS protocol may be enabled on the network element selected as the RPL owner. ERPS protocol may then be enabled on the other network elements 202 in service provider network 102. In some embodiments, ERPS protocol may be enabled on the network elements in order, proceeding from the RPL owner around the network ring. For example, after enabling ERPS protocol on network element 202-6 (the RPL owner), ERPS protocol may be enabled on the remaining network elements from 202-5→202-4→202-3→202-2→202-1 or from 202-1→202-2→202-3→202-4→202-5. In certain embodiments, embodiments, ERPS protocol may be enabled on the network elements in any order from the RPL owner. Enabling ERPS protocol on network elements 202 in order from the RPL owner may ensure that each network element running ERPS protocol is coupled to the RPL owner via other network elements enabled with ERPS protocol.

With ERPS protocol enabled on all network elements 202 in service provider network 102, the network may now be protected from loops and network failures by the ERPS protocol. Thus, the port previously shut down to protect against network loops during migration may be re-opened to network traffic. For example, port 204-1 of network element 202-6 may be enabled or brought back into service after the ERPS protocol has been enabled on all network elements 202. Despite being enabled, port 204-1 may still remain blocked to network traffic by the ERPS protocol. That is, RPL owner 202-6 may block data packets from the ring protection link, the network link between network elements 202-1 and 202-6, in order to prevent a network loop. However, in the event of a network failure, ERPS protocol may unblock 204-1 to maintain connectivity among the network elements.

Although the present disclosure has been described with respect to service provider network 102, the same methodology may be applied to any network configured in a ring topology, including, for example, customer networks 104 disclosed in FIG. 1. The present disclosure may also apply to different network topologies, including, networks with a ring within a ring, abutting rings, or any other network topology capable of supporting ERPS protocol. In addition, modifications, additions, or omissions may be made to service network 102 without departing from the scope of the disclosure. For example, the components and elements of service provider network 102 described may be integrated or separated according to particular needs. Moreover, the operations of service provider network 102 may be performed by more, fewer, or other components.

Figure 3:
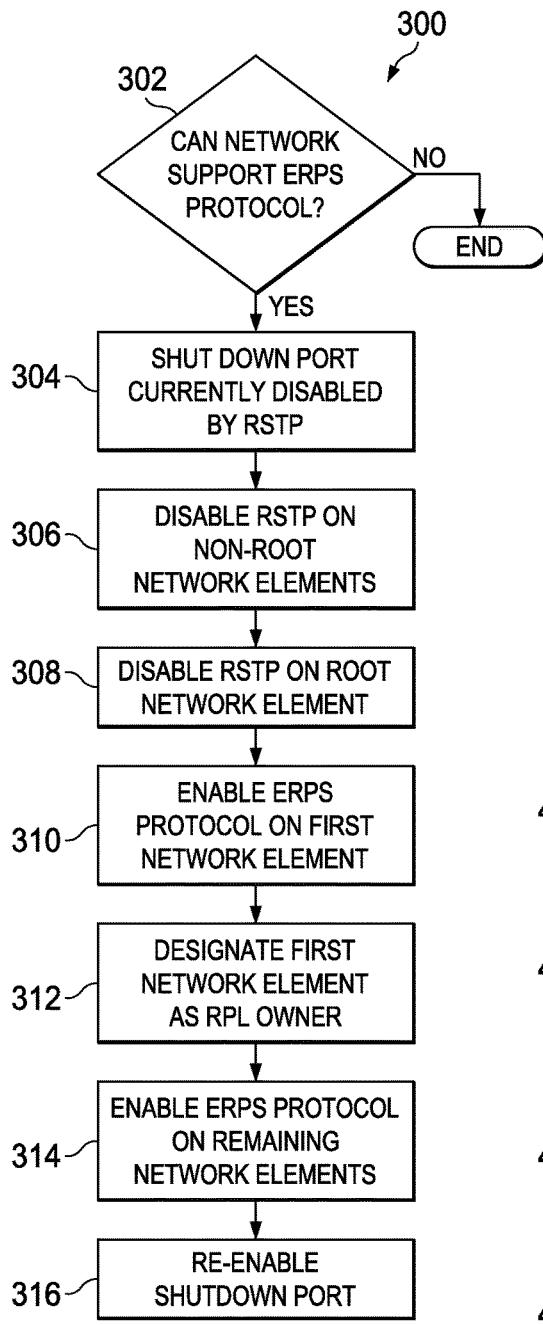
FIGS. 3 and 4 illustrate flowcharts of methods for migrating from rapid spanning tree protocol to Ethernet ring protection protocol in accordance with some embodiments of the present disclosure.
Figure 4:
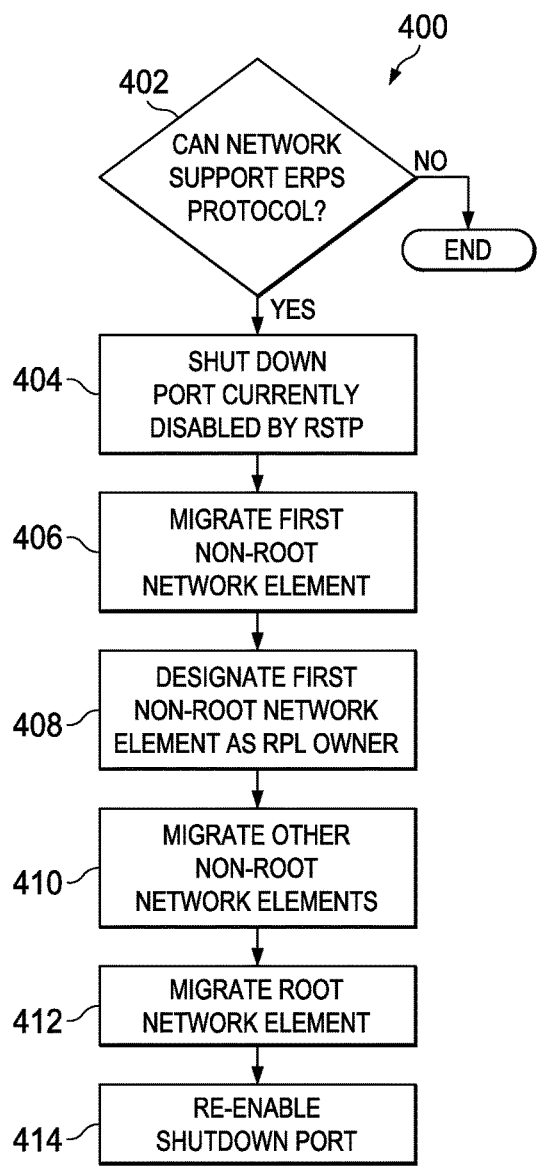

In addition to the migration method described above, service provider network 102 (or any other network capable of supporting ERPS protocol) may be migrated from RSTP to ERPS protocol using either of the methods described in more detail with respect to FIGS. 3 and 4 while ensuring network performance and reliability are maintained during the migration.

Turning now to FIG. 3, a block diagram of selected elements of an embodiment of method 300 for migrating a network from RSTP to ERPS protocol while ensuring network performance and reliability during the migration. Method 300 may be implemented by network elements 202 disclosed above with respect to FIG. 2. It is noted that certain operations depicted in method 300 may be rearranged or omitted, as desired.

Method 300 may begin by determining whether the network can support ERPS protocol (operation 302). When the result of operation 302 is NO, the method may end. The result of operation 302 may be NO if the network is not configured in a ring topology or otherwise cannot support ERPS protocol. If however, the result of operation 302 is YES, then the port currently disabled by RSTP may be shut down (operation 304). The port may be shut down in any manner, including a software command that disables all network traffic through the port. In some embodiments, the port shut down in operation 304 may be a port on a leaf node in the RSTP spanning tree, such as network element 202-6 illustrated in FIG. 2B. Next, RSTP may be disabled on the non-root network elements within the network (operation 306). In some embodiments, RSTP may be disabled in order from the leaves of the RSTP spanning tree (e.g., network elements 202-1 and 202-6 in FIG. 2B) up the spanning tree branches (e.g., spanning tree branches 220 and 222) in the direction of the root of the RSTP spanning tree (e.g., network elements 202-4) to reduce administrative traffic and network outages associated with RSTP reconfiguring the spanning tree. After RSTP has been disabled on all non-root network elements, RSTP may be disabled on the RSTP root network element (operation 308). With RSTP disabled on all network elements, ERPS protocol may be enabled on the first network element (operation 310). In some embodiments, the first network element enabled with ERPS protocol may be the same network element with the shutdown port (e.g., network elements 202-6 illustrated in FIG. 2B). In certain embodiments, the first network element enabled with ERPS protocol may be a leaf of the RSTP spanning tree. Next, the first network element enabled with ERPS protocol may be designated as the RPL owner (operation 312). Then, ERPS protocol may be enabled on the remaining network elements (operation 314). As explained with respect to FIG. 2, enabling of ERPS protocol may occur in any order, so long as each network element running ERPS protocol is coupled to the RPL owner via other network elements enabled with ERPS protocol. In some embodiments, the ERPS protocol may be enabled on the network elements by following the network ring from the RPL owner. Once ERPS protocol has been enabled on all network elements, then the port previously shut down in operation 304 may be re-enabled or brought back into service (operation 316) and the method for migrating the network from RSTP to ERPS protocol may be completed.

In some embodiments, network elements may be migrated from RSTP to ERPS protocol one at a time. That is, instead of disabling RSTP on all network elements and then enabling ERPS protocol on the network elements, each network element may be migrated (e.g., by disabling RSTP and then enabling ERPS protocol on the network element) one at a time as the network elements of the network are traversed. As an example, FIG. 4 illustrates a block diagram of selected elements of an embodiment of method 400 for migrating a network from RSTP to ERPS protocol while ensuring network performance and reliability during the migration. Method 400 may be implemented by network elements 202 disclosed above with respect to FIG. 2. It is noted that certain operations depicted in method 400 may be rearranged or omitted, as desired.

Method 400 may begin by determining whether the network can support ERPS protocol (operation 402). When the result of operation 402 is NO, the method may end. If however, the result of operation 402 is YES, then the port currently disabled by RSTP may be shut down (operation 404). Next, the first non-root network element within the network may be migrated by disabling RSTP and enabling ERPS protocol (operation 406). In some embodiments, the first network element may be a leaf of the RSTP spanning tree (e.g., network elements 202-1 and 202-6). In certain embodiments, the first network element may be the same network element with the shutdown port (e.g., network element 202-6). Next, the first network element may be designated as the RPL owner (operation 408). Then, the other non-root network elements may be migrated one network element at a time by disabling RSTP and enabling ERPS protocol (operation 410). As discussed above in relation to FIG. 2, RSTP may be disabled from the leaves to the root of the spanning tree to reduce administrative traffic and network outages associated with RSTP reconfiguring the spanning tree. In some embodiments, network elements may be migrated in order from the leaves of the RSTP spanning tree (e.g., network elements 202-1 and 202-6 in FIG. 2B) up the spanning tree branches (e.g., spanning tree branches 220 and 222) in the direction of the root of the RSTP spanning tree (e.g., network elements 202-4) to reduce administrative traffic and network outages associated with RSTP reconfiguring the spanning tree. Next, the RSTP root network element may be migrated by disabling RSTP and enabling ERPS protocol (operation 412). Once ERPS protocol has been enabled on all network elements, then the port previously shut down in operation 404 may be re-enabled or brought back into service (operation 414) and the method for migrating the network from RSTP to ERPS protocol may be completed.

Although illustrated as separate methods in FIGS. 3 and 4, any of the operations depicted in methods 300 and 400 may be combined, rearranged, and/or omitted as desired. Any of the operations of methods 300 and 400 may be performed manually by, for example, a network administrator using a network management system and/or an operation support system to execute each operation. Also, any of the operations of methods 300 and 400 may be performed in an automated manner by a script, program, and/or executable. In some embodiments, a combination of manual and automated means may be used to perform one or more of the operations of methods 300 and 400.

By migrating from RSTP to ERPS protocol according to this disclosure, a network may seamlessly transition between the loop-breaking protocols without affecting the performance or reliability of the network during the migration. During the migration, the network may be continue to pass data packets between the network elements without delay or outages that may otherwise be associated with migrating from RSTP to ERPS protocol on a live network. Thus, a network may gain the benefits of migrating to ERPS protocol without impacting customers or users of the network.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for migrating an Ethernet network from a rapid spanning tree protocol (RSTP) to Ethernet ring protection switching (ERPS), the method comprising:

disabling a port of a first leaf network element in a network implementing a RSTP, the RSTP having a spanning tree with a root network element coupled to the first leaf network element forming a first branch of the spanning tree;

migrating the first leaf network element by disabling the RSTP running on the first leaf network element and enabling an ERPS protocol on the first leaf network element;

migrating a second leaf network element after the first leaf network element by disabling the RSTP running on the second leaf network element and enabling the ERPS protocol on the second leaf network element, the second leaf network element forming a second branch of the spanning tree;

migrating a plurality of network elements after the first leaf network element and the second leaf network element by disabling the RSTP running on the plurality of network elements and enabling the ERPS protocol on the plurality of network elements, the plurality of network elements forming the first branch and the second branch of the spanning tree;

migrating the root network element after migrating the first leaf network element, the second leaf network element, and the plurality of network elements by disabling the RSTP running on the root network element and enabling the ERPS protocol on the root network element; and enabling the port of the first leaf network element after the disabling of the RSTP running on the first leaf network element, the second leaf network element, the plurality of network elements, and the root network element and the enabling of the ERPS protocol on the first leaf network element, the second leaf network element, the plurality of network elements, and the root network element such that the ERPS protocol is enabled on all network elements comprising the Ethernet network and RSTP is disabled on all network elements comprising the Ethernet network.

2. The method of claim 1, wherein the port of the first leaf network element is the same port blocked by the RSTP.

3. The method of claim 1, further comprising designating the first leaf network element as a ring protection link owner in charge of preventing a network loop.

4. The method of claim 1, wherein the plurality of network elements forming the first branch are migrated in order from the first leaf network element to the root network element.

5. A network element in an Ethernet network, comprising:
a processor;
non-transitory computer readable memory media accessible to the processor,
wherein the memory media store processor-executable instructions to migrate the Ethernet network from a rapid spanning tree protocol (RSTP) to Ethernet ring protection switching (ERPS), the instructions, when executed by the processor, cause the processor to:
disable a port of a first leaf network element in a network implementing a RSTP, the RSTP having a spanning tree with a root network element coupled to the first leaf network element forming a first branch of the spanning tree;
migrate the first leaf network element by disabling the RSTP running on the first leaf network element and enabling an ERPS protocol on the first leaf network element;
migrate a second leaf network element after the first leaf network element and the second leaf network element by disabling the RSTP running on the second leaf network element and enabling the ERPS protocol on the second leaf network element, the second leaf network element forming a second branch of the spanning tree;
migrate a plurality of network elements after the first leaf network element by disabling the RSTP running on the plurality of network elements and enabling the ERPS protocol on the plurality of network elements, the plurality of network elements forming the first branch and the second branch of the spanning tree;
migrate the root network element after migrating the first leaf network element, the second leaf network element, and the plurality of network elements by disabling the RSTP running on the root network element and enabling the ERPS protocol on the root network element; and
enable the port of the first leaf network element after the disabling of the RSTP running on the first leaf network element, the second leaf network element, the plurality of network elements, and the root network element and the enabling of the ERPS protocol on the first leaf network element, the second leaf network element, the plurality of network elements, and the root network element such that the ERPS protocol is enabled on all network elements comprising the Ethernet network and RSTP is disabled on all network elements comprising the Ethernet network.

6. The network element of claim 5, wherein the port of the first leaf network element is the same port blocked by the RSTP.

7. The network element of claim 5, further comprising instructions executable to designate the first leaf network element as a ring protection link owner in charge of preventing a network loop.

8. The network element of claim 5, wherein the plurality of network elements forming the first branch are migrated in order from the first leaf network element to the root network element.

9. A method for migrating an Ethernet network from a rapid spanning tree protocol (RSTP) to Ethernet ring protection switching (ERPS), the method comprising:
disabling a port of a first leaf network element in a network implementing a RSTP, the RSTP having a spanning tree with a root network element coupled to the first leaf network element forming a first branch of the spanning tree;
disabling the RSTP on the first leaf network element;
disabling the RSTP on a second leaf network element after the first leaf network element, the second leaf network element forming a second branch of the spanning tree;
disabling RSTP on a plurality of network elements after the first leaf network element and the second leaf network element, the plurality of network elements forming the first branch and the second branch of the spanning tree;
disabling the RSTP on the root network element after disabling the RSTP on the first leaf network element, the second leaf network, and the plurality of network elements;
enabling ERPS protocol on the first leaf network element;
enabling ERPS protocol on the second leaf network element after enabling ERPS protocol on the first leaf network element;
enabling ERPS protocol on the plurality of network elements after enabling ERPS protocol on the first leaf network element and the second leaf network element;
enabling ERPS protocol on the root network element after enabling ERPS protocol on the first leaf network element, the second leaf network element, and the plurality of network elements;
enabling the port of the first leaf network element after the disabling the RSTP running on the first leaf network element, the second leaf network element, the plurality of network elements, and the root network element and the enabling ERPS protocol on the first leaf network element, the second leaf network element, the plurality of network elements, and the root network element such that the ERPS protocol is enabled on all network elements comprising the Ethernet network and RSTP is disabled on all network elements comprising the Ethernet network.

10. The method of claim 9, wherein the port of the first leaf network element is the same port blocked by the RSTP.

11. The method of claim 9, further comprising designating the first leaf network element as a ring protection link owner in charge of preventing a network loop.

12. The method of claim 9, wherein the RSTP is disabled on the plurality of network elements forming the first branch in order from the first leaf network element to the root network element.

13. The method of claim 9, wherein ERPS protocol is enabled on the plurality of network elements forming the first branch in order from the first leaf network element to the root network element.

* * * * *